(12) United States Patent
Kono (10) Patent No.: US 8,422,149 B2
(45) Date of Patent: Apr. 16, 2013

(54) LIGHT MODULATION DEVICE AND PROJECTOR

(75) Inventor: Masaru Kono, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 284 days.

(21) Appl. No.: 12/911,950

(22) Filed: Oct. 26, 2010

(65) Prior Publication Data

US 2011/0141549 A1   Jun. 16, 2011

(30) Foreign Application Priority Data

Dec. 15, 2009   (JP) ................. 2009-283745

(51) Int. Cl.
  *G02B 9/08*  (2006.01)
(52) U.S. Cl.
  USPC ....................................... 359/738
(58) Field of Classification Search .......... 359/316, 359/738–740
  See application file for complete search history.

(56) References Cited

FOREIGN PATENT DOCUMENTS

| JP | A-10-039239 | 2/1998 |
| JP | A-10-232355 | 9/1998 |
| JP | A-2005-70091 | 3/2005 |
| WO | WO 2004/086098 A2 * | 10/2004 |

* cited by examiner

*Primary Examiner* — Joseph P Martinez
(74) *Attorney, Agent, or Firm* — Oliff & Berridge, PLC (57) ABSTRACT

A light modulation device that modulates an incident luminous flux according to image information to form an image, includes: a light modulation section that is disposed in each of pixels constituting the image, wherein the light modulation section includes a condensing lens that concentrates the incident luminous flux, a shutter that is configured to be movable to a first position in which the shutter allows the luminous flux concentrated by the condensing lens to pass, or a second position in which the shutter blocks the luminous flux concentrated by the condensing lens, and a driver that moves the shutter to the first position or the second position.

9 Claims, 12 Drawing Sheets

LIGHT MODULATION DEVICE AND PROJECTOR

BACKGROUND

1. Technical Field

The present invention relates to a light modulation device and a projector.

2. Related Art

In projectors, as a light modulation device that modulates an incident luminous flux according to image information to form an image, a light modulation device manufactured by a micro electro mechanical system (MEMS) technology, in addition to a light modulation device using liquid crystal, has been known in the related art (refer to JP-A-2005-70091, for example).

A light modulation device disclosed in JP-A-2005-70091 is composed of a digital micromirror device (DMD; trademark of Texas Instruments Incorporated, US) in which a micro mirror is disposed in each pixel and a luminous flux emitted from a light source is light-modulated by controlling the incident angle of the micro mirror for forming an image.

The light modulation device manufactured by such a MEMS technology has an advantage in that the problem of thermal degradation of liquid crystal or the like is not caused, which facilitates a longer service life.

However, when a DMD is used as a light modulation device, since the luminous flux emitted from the light source is reflected by the micro mirror, part of the incident luminous flux is absorbed by the micro mirror upon reflection.

That is, since the brightness of an image projected by a projector is reduced by an amount of the part of the luminous flux absorbed by the micro mirror, there is a problem in that it is difficult to efficiently use the luminous flux emitted from the light source.

SUMMARY

An advantage of some aspects of the invention is to provide a light modulation device and a projector both excellent in light use efficiency.

A first aspect of the invention is directed to a light modulation device that modulates an incident luminous flux according to image information to form an image, including: a light modulation section that is disposed in each of pixels constituting the image, wherein the light modulation section includes a condensing lens that concentrates the incident luminous flux, a shutter that is configured to be movable to a first position in which the shutter allows the luminous flux concentrated by the condensing lens to pass, or a second position in which the shutter blocks the luminous flux concentrated by the condensing lens, and a driver that moves the shutter to the first position or the second position.

In the light modulation device according to the first aspect of the invention, the light modulation section having the shutter and the driver is disposed in each of pixels. The light modulation device positions each of the shutters to the first position or the second position with each of the drivers to switch between passage and blockage of the incident luminous flux, thereby performing light modulation to form an image.

Thus, similarly to the case of using a related-art DMD, the problem of thermal degradation of liquid crystal or the like is not caused, which facilitates a longer service life.

Since the shutter is used for light modulation, light constituting an image is not absorbed by a mirror or the like, which can improve light use efficiency, compared to the case of using a related-art DMD.

Further, since the light modulation section concentrates the incident luminous flux with the condensing lens and switches between the passage and blockage of the concentrated luminous flux with the shutter, the size of the shutter can be reduced. Moreover, light use efficiency can be further improved compared to the case of not using a condensing lens.

The light modulation device according to the first aspect of the invention is preferably configured such that the shutter has an opening and is configured to be rotatable about a rotation axis along an opening direction of the opening, and that the driver applies force to a peripheral edge of the shutter to rotate the shutter, thereby moving the shutter to the first position in which the shutter allows the luminous flux to pass through the opening, or the second position in which the shutter blocks the luminous flux at a portion excluding the opening.

In the first aspect of the invention, the driver applies force to the peripheral edge of the shutter that is rotatable about the rotation axis, thereby moving the shutter to the first position or the second position. Therefore, the shutter can be easily moved with weak force compared to a shutter or the like that simply moves slidably.

A second aspect of the invention is directed to a light modulation device that modulates an incident luminous flux according to image information to form an image, including: a light modulation section that is disposed in each of pixels constituting the image, wherein the light modulation section includes a shielding member that has an opening allowing the incident luminous flux to pass, a shutter that is configured to be movable to a first position in which the shutter opens the opening, or a second position in which the shutter closes the opening, and a driver that moves the shutter to the first position or the second position.

In the light modulation device according to the second aspect of the invention, the light modulation section having the shutter and the driver is disposed in each of pixels. The light modulation device positions each of the shutters to the first position or the second position with each of the drivers to switch between passage and blockage of the incident luminous flux, thereby performing light modulation to form an image.

Thus, similarly to the above, a longer service life of the light modulation device is facilitated, and light use efficiency can be improved.

The light modulation device according to the second aspect of the invention is preferably configured such that the light modulation section includes a condensing lens that concentrates the incident luminous flux onto the opening.

The light modulation section according to the second aspect of the invention concentrates the incident luminous flux onto the opening with the condensing lens, and switches between the passage and blockage of the concentrated luminous flux with the shutter. Therefore, the light modulation section reduces the rate of luminous flux blocked by the shielding member (portion excluding the opening), can improve the aperture ratio, and can further improve light use efficiency.

The light modulation device according to the first and second aspects of the invention is preferably configured such that a surface of the shutter on a light-incident side is a reflection surface that reflects the incident luminous flux.

In the first and second aspects of the invention, when the shutter is positioned at the second position, the luminous flux blocked by the shutter is reflected by the surface of the shutter. Therefore, the temperature rise of the shutter can be reduced.

A third aspect of the invention is directed to a projector including the light modulation device according to the first and second aspects of the invention.

Since the projector according to the third aspect of the invention includes the light modulation device according to the first and second aspects of the invention, a similar advantage to that of the light modulation device according to the first and second aspects of the invention is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described based on the drawings.

Configuration of Projector

Figure 1:
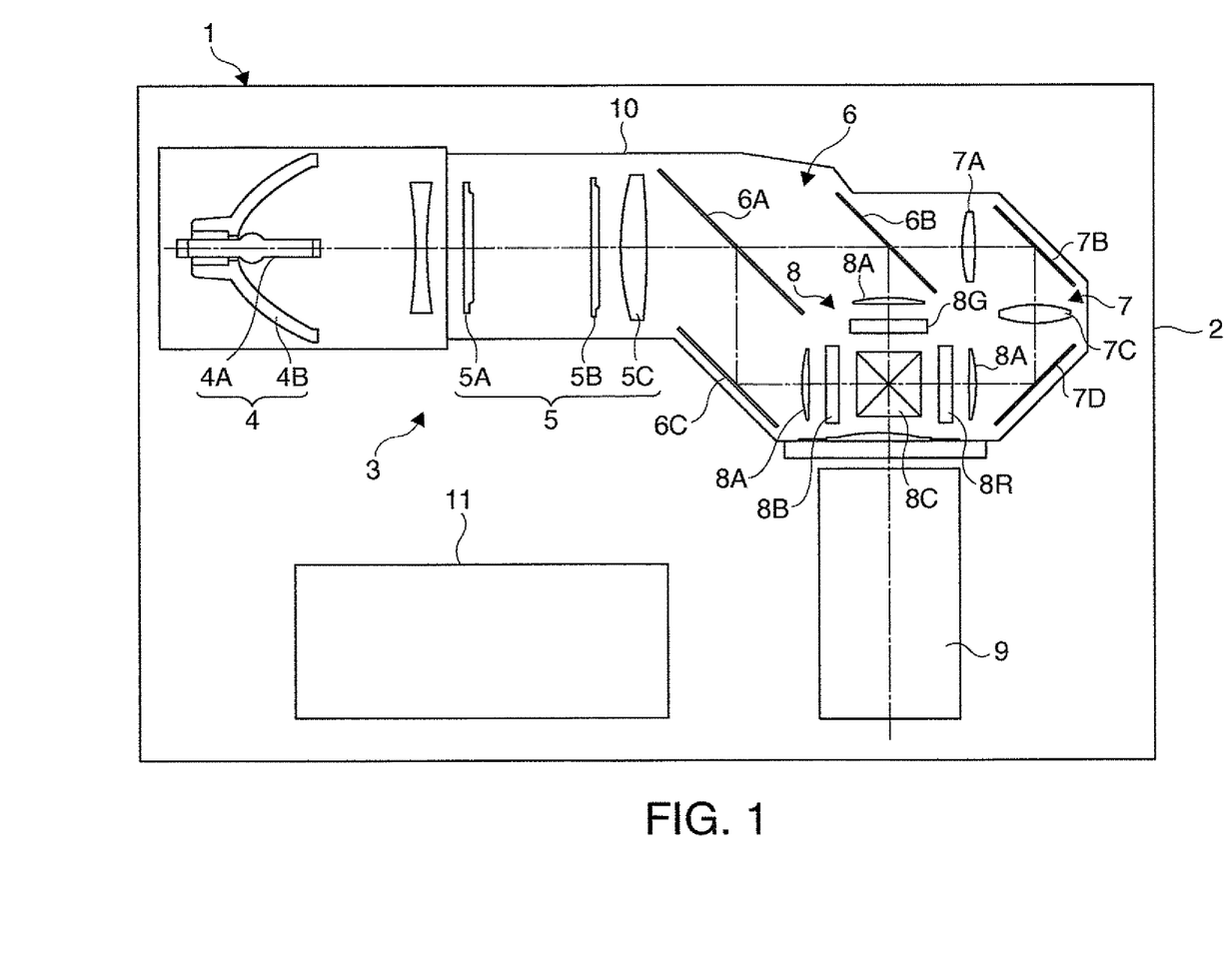
FIG. 1 is a plan view schematically showing the schematic configuration of a projector in a first embodiment.

FIG. 1 is a plan view schematically showing the schematic configuration of a projector 1.

The projector 1 modulates a luminous flux emitted from a light source according to image information to form an image, and projects the image onto a projection surface such as a screen. As shown in FIG. 1, the projector 1 is schematically composed of an outer casing 2 having a substantially rectangular parallelepiped shape, an optical unit 3 housed in the interior of the outer casing 2, and a controller 11.

Although not specifically shown in the drawing, in addition to the optical unit 3 and the controller 11, a power source unit that supplies power from the outside to constituent members of the projector 1, a cooling unit that cools the interior of the projector 1, and the like are arranged in the interior of the outer casing 2.

The optical unit 3, which is arranged in the interior of the outer casing 2, forms an image and projects the image. As shown in FIG. 1, the optical unit 3 includes a light source device 4 having a light source lamp 4A and a reflector 4B; an illumination optical device 5 having lens arrays 5A and 5B and a superimposing lens 5C; a color-separating optical device 6 having dichroic mirrors 6A and 6B and a reflection mirror 6C; a relay optical device 7 having an incident-side lens 7A, a relay lens 7C, and reflection mirrors 7B and 7D; an optical device 8 having three field lenses 8A, three light modulation devices 8R, 8G, and 8B (8R is the light modulation device on the red light side, 8G is the light modulation device on the green light side, and 8B is the light modulation device on the blue light side), and a cross dichroic prism 8C as a color-combining optical device; a projection lens 9 as a projection optical device; and a casing 10 for optical component housing the optical components 4 to 8 and supporting the projection lens 9.

With the above configuration in the optical unit 3, the luminous flux emitted from the light source device 4 and passed through the illumination optical device 5 is separated into three color lights of R, G, and B by the color-separating optical device 6. The separated color lights are substantially collimated by the respective field lenses 8A, and modulated by the respective light modulation devices 8R, 8G, and 8B according to the image information. The modulated color lights are combined by the prism 8C to form a color image, and projected onto a screen by the projection lens 9.

The controller 11, which is arranged in the interior of the outer casing 2, controls the entire projector 1. Specifically, the controller 11 controls the light modulation devices 8R, 8G, and 8B included in the optical unit 3, and causes the light modulation devices 8R, 8G, and 8B to form an image based on the image information (image signal).

Configuration of Light Modulation Device

Figure 2:
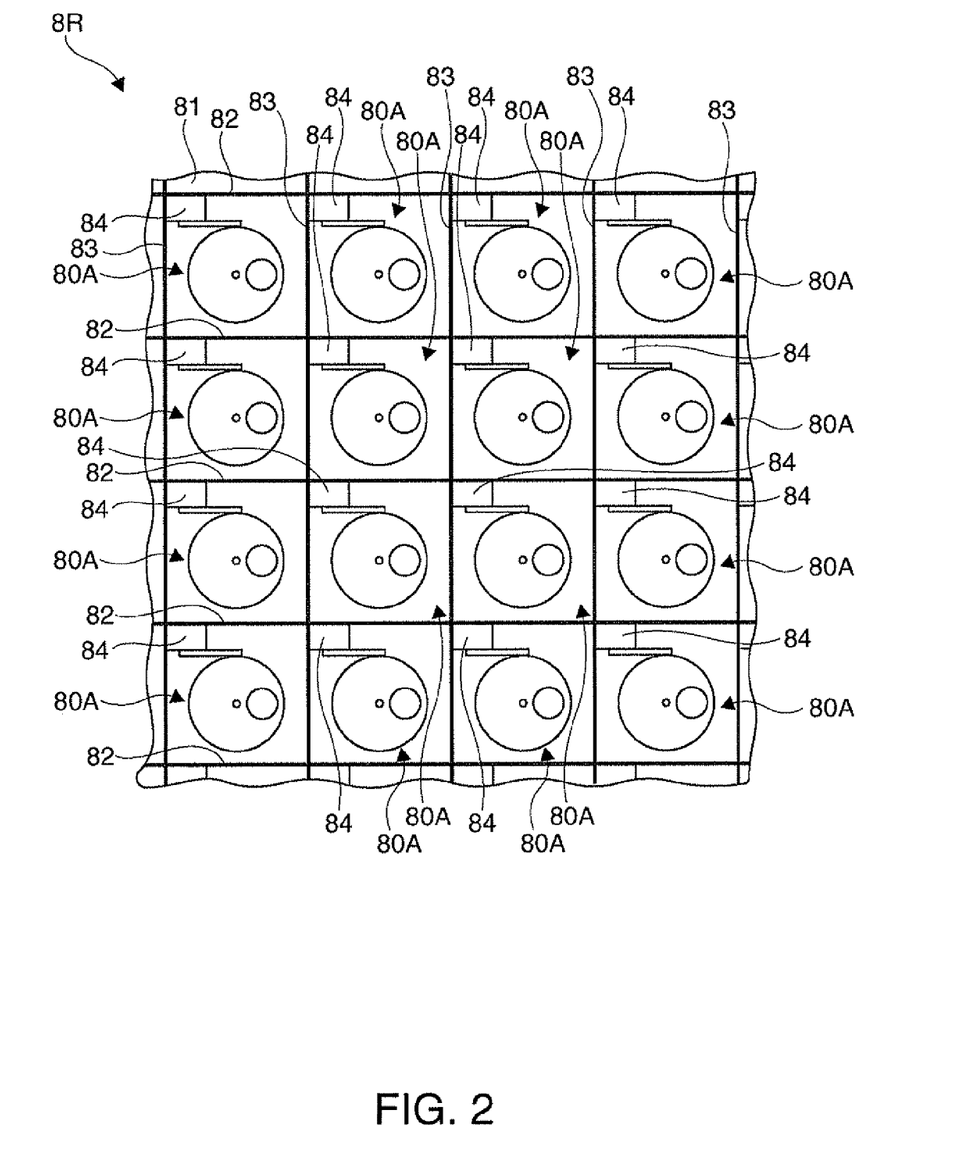
FIG. 2 is a plan view schematically showing a light modulation device in the embodiment.
Figure 3A:
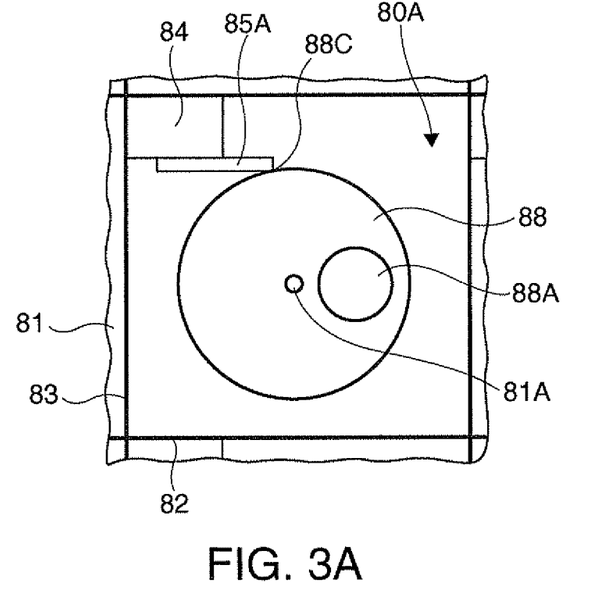
FIGS. 3A and 3B are plan views for explaining a light modulation section of the embodiment.
Figure 3B:
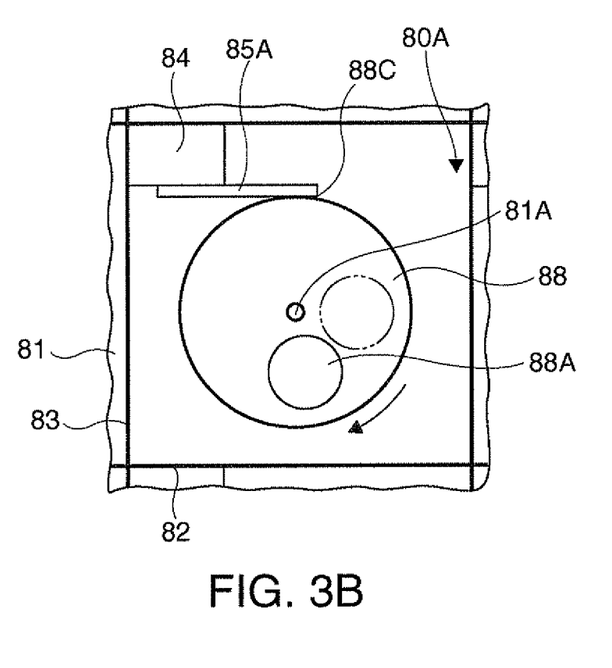
Figure 4A:
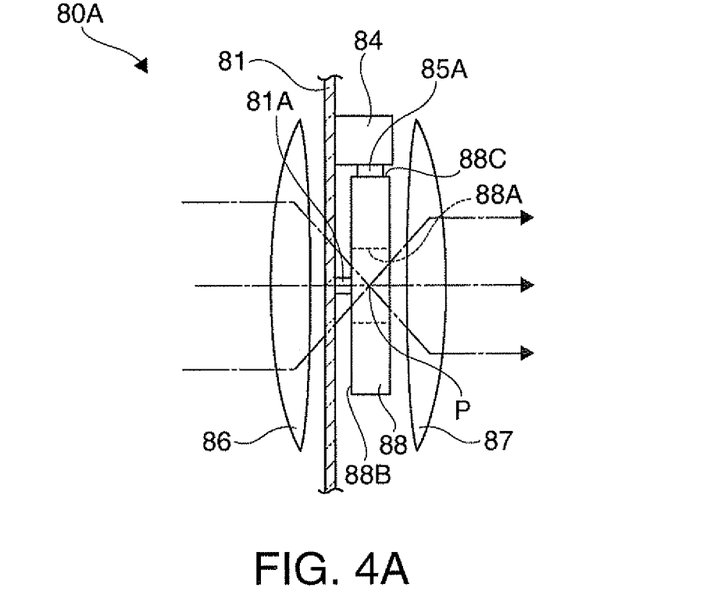
FIGS. 4A and 4B are side views for explaining the light modulation section of the embodiment.
Figure 4B:
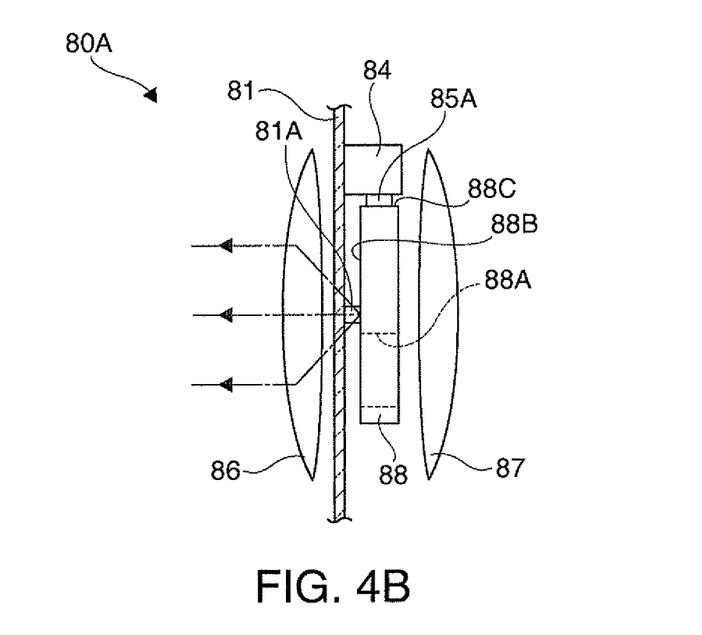

FIG. 2 is a plan view schematically showing the light modulation device 8R. Specifically, FIG. 2 partially shows the light modulation device 8R on the luminous flux-incident side as viewed in plan. Although the light modulation device 8R will be described below as a representative example, the light modulation devices 8G and 8B also have the same configuration. In FIG. 2, and FIGS. 3A and 3B described below, later-described microlenses 86 and 87 shown in FIGS. 4A and 4B are not illustrated for facilitating the description.

As shown in FIG. 2, the light modulation device 8R includes a plurality of light modulation sections 80A, a supporting member 81, a plurality of scanning (gate) lines 82, and a plurality of signal lines 83.

The supporting member 81 is formed of a light-transmissive material that transmits light, such as glass.

Although not specifically shown in the drawing, a light shielding film is formed on a surface of the supporting member 81 on the light-incident side. The light shielding film has such a lattice shape that covers the plurality of scanning lines 82, the plurality of signal lines 83, and later-described circuit boards 84 constituting the plurality of light modulation sections 80A. The light shielding film prevents the members 82, 83, and 84 and the like from being irradiated with the luminous flux.

The plurality of scanning lines 82 are formed on a surface of the supporting member 81 on the light-exiting side so as to extend in the row direction, and are arranged in parallel in the column direction. The plurality of scanning lines 82 supply control signals output from the controller 11 shown in FIG. 1 to the later-described circuit boards 84.

The plurality of signal lines 83 are formed on the surface of the supporting member 81 on the light-exiting side so as to extend in the column direction, and arranged in parallel in the row direction. The plurality of signal lines 83 supply drive signals output from the controller 11 to the circuit boards 84.

The light modulation section 80A is disposed in each of pixels constituting an image. The light modulation sections 80A are arranged in a matrix so that each of the light modulation sections 80A corresponds to each intersecting portion of the scanning line 82 and the signal line 83. For example, for creating an image of 1024×768 pixels by the light modulation device 8R, the light modulation device 8R includes 1024×768 pieces of the light modulation sections 80A.

FIGS. 3A to 4B are diagrams for explaining the light modulation section 80A. Specifically, FIGS. 3A and 3B are elevation views of the light modulation section 80A; and FIGS. 4A and 43 are side views of the light modulation section 80A. In FIGS. 4A and 4B, the scanning lines 82 and the signal lines 83 are not illustrated.

As shown in FIGS. 2 to 4B, the light modulation section 80A includes the circuit board 84, a piezoelectric element 85A, the microlenses 86 and 87 (FIGS. 4A and 48), and a shutter 88.

The circuit board 84, which is disposed on the surface of the supporting member 81 on the light-exiting side, includes a switching element (not shown). The circuit board supplies the above-described drive signal to the piezoelectric element 85A via the switching element, so that drive voltage can be applied to the piezoelectric element 85A. The switching element switches between a conductive state and a non-conductive state according to the above-described control signal. That is, driving of the piezoelectric element 85A (application of drive voltage to the piezoelectric element 85A) is controlled by the controller 11.

The piezoelectric element 85A as a driver expands and contracts according to the application state of voltage by the circuit board 84. One end of the piezoelectric element 85A in the expansion and contraction direction is supported by the circuit board 84.

The first microlens 86 as a condensing lens, which is arranged on the light-incident side of the supporting member 81, concentrates a luminous flux emitted from the field lens 8A onto a focal point position P (FIGS. 4A and 4B).

The second microlens 87 is arranged on the light-exiting side of the supporting member 81. More specifically, the second microlens 87 is arranged so that a focal point position thereof coincides with the focal point position P of the first microlens 86. The second microlens 87 emits the luminous flux concentrated by the first microlens 86 as a substantially collimated light.

As shown in FIGS. 3A and 3B, the shutter 88 is formed into a disk shape and has a circular opening 88A at a position shifted from its central position. The shutter 88 is connected at its substantially central position to a rotation axis 81A that protrudes from the surface of the supporting member 81 on the light-exiting side along the opening direction of the opening 88A, thereby being rotatably journalled about the rotation axis 81A.

A surface 88B (FIGS. 4A and 4B) of the shutter 88 on the light-incident side is a reflection surface. Specifically, the reflection surface is formed by depositing a material with a high optical reflectance, such as aluminum, on the surface 88B.

The other end of the piezoelectric element 85A in the expansion and contraction direction is connected to a peripheral edge 88C of the shutter 88. That is, force is applied to the peripheral edge 88C due to the expansion and contraction of the piezoelectric element 85A, whereby the shutter 88 rotates about the rotation axis 81A.

In the embodiment, the rotational position of the shutter 88 according to the expansion and contraction of the piezoelectric element 85A is set as follows.

That is, in a state where the piezoelectric element 85A contracts as shown in FIG. 3A or 4A, the shutter 88 is positioned at a first position in which the opening 88A overlaps the focal point position P of the first microlens 86 and the luminous flux concentrated by the first microlens 86 is allowed to pass through the opening 88A. The luminous flux passed through the opening 88A is incident on the second microlens 87, collimated by the second microlens 87, and emitted to the prism 8C.

In a state where the piezoelectric element 85A expands as shown in FIG. 3B or 4B, the shutter 88 is positioned at a second position in which the opening 88A does not overlap the focal point position P of the first microlens 86 and the luminous flux concentrated by the first microlens 86 is blocked. The luminous flux blocked by the shutter 88 (portion excluding the opening 88A) is reflected by the surface 88B and returned to the field lens 8A side.

The light modulation device 8R performs light modulation by controlling the gradation of an image as follows. The following control is performed by the controller 11 controlling the driving of the piezoelectric element 85A, that is, controlling the position of the shutter 88.

Figure 5A:
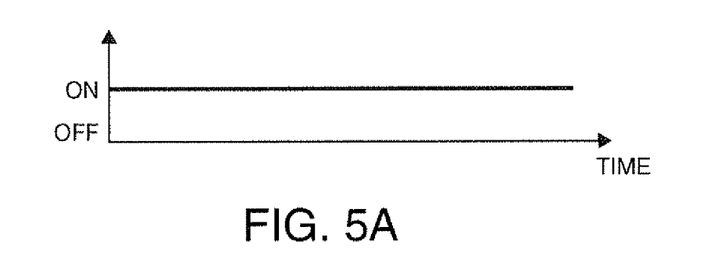
FIGS. 5A to 5C are diagrams for explaining gradation control in the light modulation device of the embodiment.
Figure 5B:
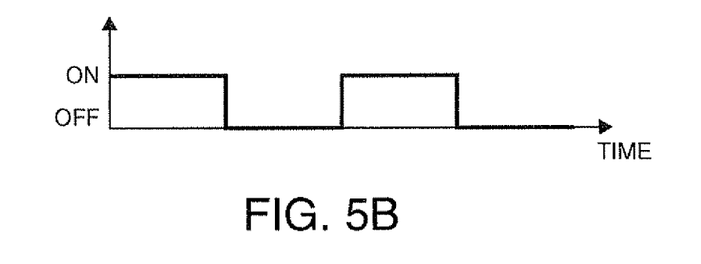
Figure 5C:
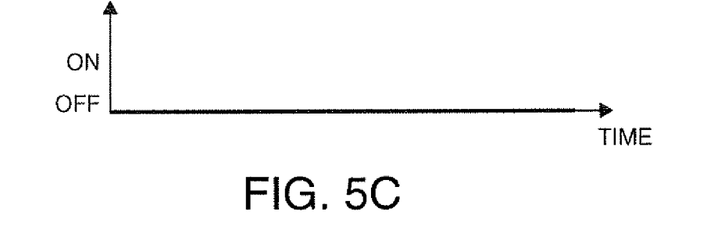

FIGS. 5A to 5C are diagrams for explaining gradation control in the light modulation device 8R. FIG. 5A shows the case of controlling the gradation of red light to 100%; FIG. 5B shows the case of controlling the gradation of red light to 50%; and FIG. 5C shows the case of controlling the gradation of red light to 0%. The horizontal axis in FIGS. 5A to 5C represents a time axis, while the vertical axis represents the state of the shutter 88. The shutter 88 is positioned at the first position when in the state of "ON", while being positioned at the second position when in the state of "OFF".

As shown in FIG. 5A, under the control of the controller 11, the state of the shutter 88 per unit time is always set to "ON", so that the gradation of red light in the unit time can be 100%. As shown in FIG. 5B, the "ON" time and the "OFF" time are each set to 50%, so that the gradation of red light can be 50%. As shown in FIG. 5C, the state of the shutter 88 is always set to "OFF", the gradation of red light can be 0%. In the light modulation device 8R in this manner, "ON" and "OFF" are time-modulated according to image information, that is, the "ON" to "OFF" time ratio is changed, so that the gradation of an image can be controlled.

As described above, the gradation control in the light modulation device 8R can be performed by binary ("ON" and "OFF") pulse-width modulation (PWM).

The first embodiment provides the following advantage.

In each of the light modulation devices 8R, 8G, and 8B in the embodiment, the light modulation section 80A having the shutter 88 and the piezoelectric element 85A is disposed in each pixel. The light modulation devices 8R, 8G, and 8B position each of the shutters 88 at the first position or the second position with each of the piezoelectric elements 85A to switch between passage and blockage of an incident luminous flux, thereby performing light modulation to form an image.

Thus, similarly to the case of using a related-art DMD, the problem of thermal degradation of liquid crystal or the like is not caused, which facilitates a longer service life.

When the shutter 88 is moved to the first position by the piezoelectric element 85A, an incident luminous flux passes through the shutter 88. When the shutter 88 is moved to the second position by the piezoelectric element 85A, an incident luminous flux is blocked by the shutter 88. Since the light modulation devices 8R, 8G, and 8B time-modulate the first position and the second position according to image information, the gradation of an image can be increased if the time for the first position is lengthened, and the gradation of an image can be decreased if the time for the second position is lengthened.

Since the light modulation devices 8R, 8G, and 8B use the shutter 88 for light modulation in this manner, light constituting an image is not absorbed by a mirror or the like, which can improve light use efficiency, compared to the case of using a related-art DMD.

Since the light modulation section 80A concentrates an incident luminous flux with the microlens 86, and switches between passage and blockage of the concentrated luminous flux with the shutter 88, the size of the shutter 88 can be reduced. Moreover, light use efficiency can be further improved compared to the case where the luminous flux is not concentrated by the microlens 86. When the shutter 88 is moved to the first position, a luminous flux emitted from the field lens 8A can be concentrated by the microlens 86 without wasting to pass through the opening 88A. Therefore, it is possible to realize substantially 100% aperture ratio.

In the light modulation devices 8R, 8G, and 8B, the shutter 88 has the opening 88A and is configured to be rotatable about the rotation axis 81A along the opening direction of the opening 88A. The piezoelectric element 85A applies force to the peripheral edge 88C of the shutter 88 to rotate the shutter 88, thereby moving the shutter 88 to the first position in which the shutter allows a luminous flux to pass through the opening 88A, or the second position in which the shutter blocks a luminous flux at the portion excluding the opening 88A. Therefore, the shutter 88 can be easily moved with weak force compared to a shutter or the like that simply moves slidably.

In the light modulation devices 8R, 8G, and 8B, the surface 88B of the shutter 88 on the light-incident side is a reflection surface that reflects an incident luminous flux. Thus, when the shutter 88 is positioned at the second position, a luminous flux blocked by the shutter 88 is reflected by the surface 88B. Therefore, the temperature rise of the shutter 88 can be reduced. Moreover, the luminous flux reflected by the surface 88B can be reused, which can further improve light use efficiency.

Second Embodiment

Next, a second embodiment of the invention will be described based on the drawings.

In the following description, configurations similar to those of the first embodiment and the same members as those in the first embodiment are denoted by the same reference numerals and signs, and the detailed description thereof is omitted or simplified.

Configuration of Light Modulation Device

Figure 6:
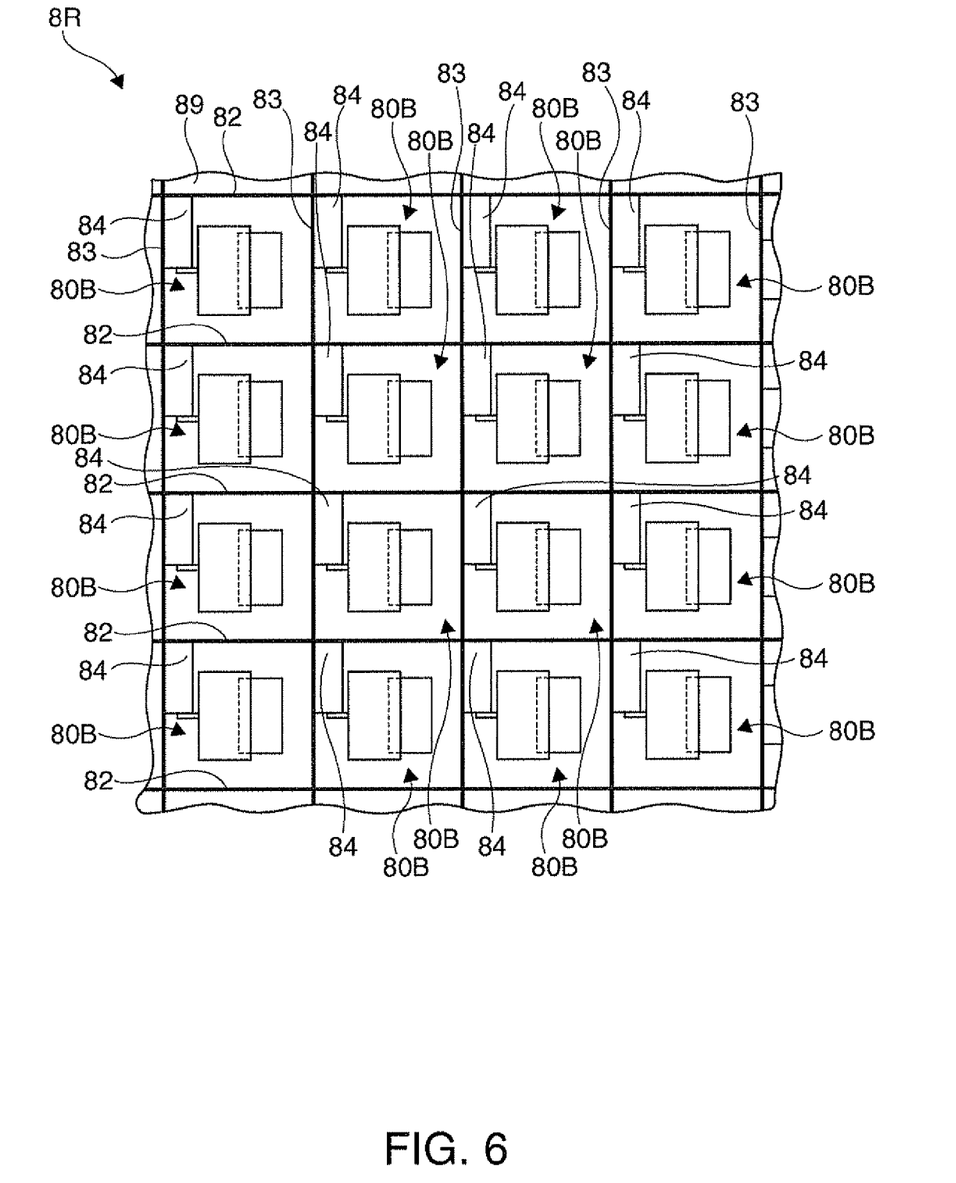
FIG. 6 is a diagram schematically showing a light modulation device in a second embodiment.
Figure 7A:
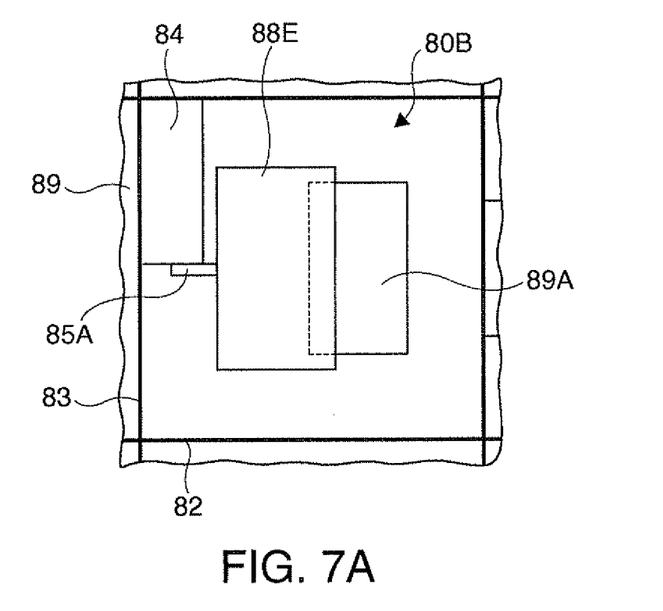
FIGS. 7A and 7B are plan views for explaining a light modulation section of the embodiment.
Figure 7B:
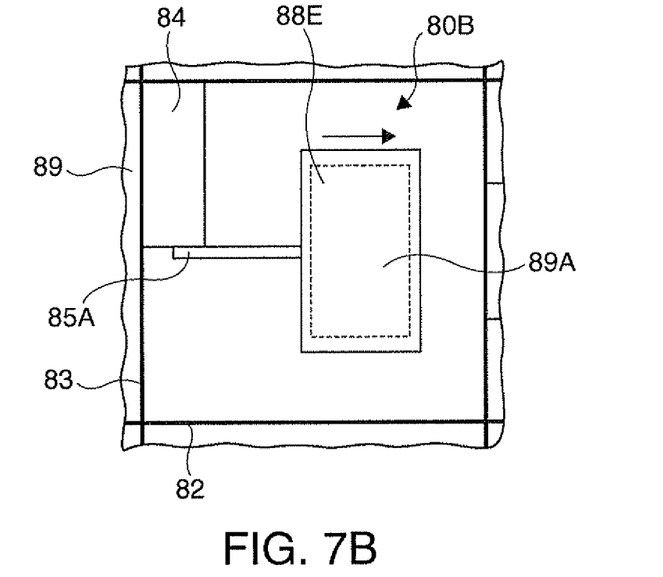
Figure 8A:
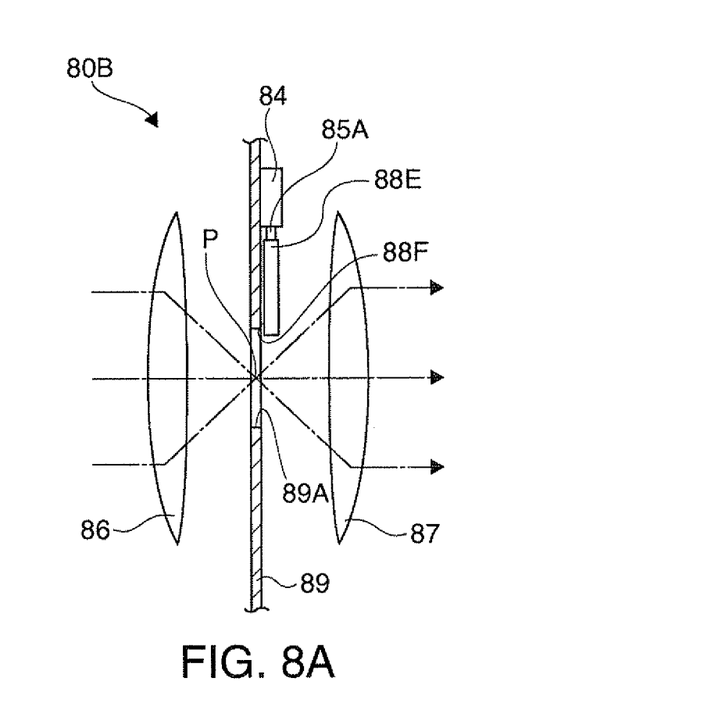
FIGS. 8A and 8B are top views for explaining the light modulation section of the embodiment.

FIG. 6 is a plan view schematically showing the light modulation device 8R. Similarly to the first embodiment, although the light modulation device 8R will be described herein as a representative example, the light modulation devices 8G and 8B also have the same configuration. In FIG. 6, and FIGS. 7A and 7B described below, the microlenses 86 and 87 shown in FIGS. 8A and 8B are not illustrated for facilitating the description.

As shown in FIG. 6, the light modulation device 8R of the embodiment includes light modulation sections 80B as the light modulation sections 80A of the first embodiment.

Figure 8B:
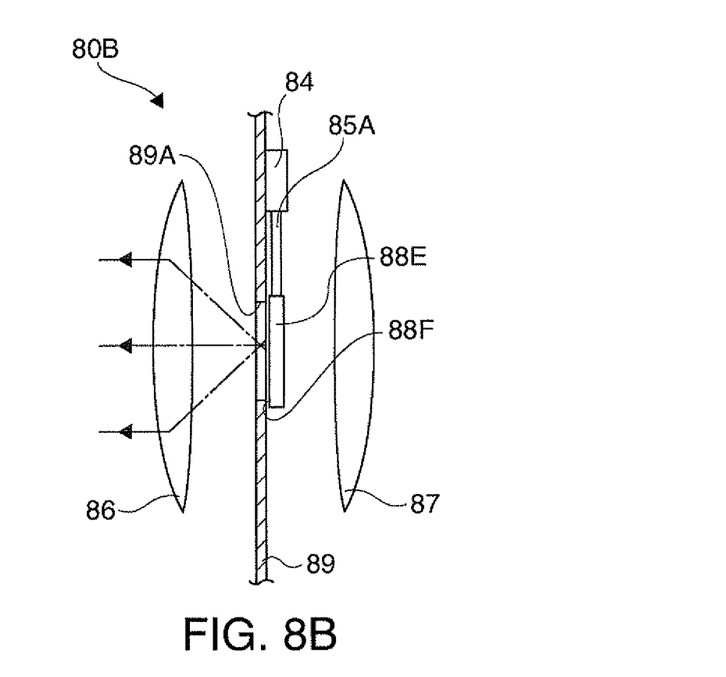

FIGS. 7A to 8B are diagrams for explaining the light modulation section 80B. Specifically, FIGS. 7A and 73 are elevation views of the light modulation section 80B; and FIGS. 8A and 8B are top views of the light modulation section 80B.

As shown in FIGS. 6 to 8B, the light modulation section 80B includes the circuit board 84, the piezoelectric element 85A, the microlenses 86 and 87 (FIGS. 8A and 8B), a shutter 88B, and a shielding member 89.

The shielding member 89 is disposed between the microlenses 86 and 87, and is formed of one member for common use among the light modulation sections 80B as shown in FIG. 6. The shielding member 89 includes openings 89A each at a position corresponding to each of the light modulation sections 80B. Specifically, the shielding member 89 is configured so as not to transmit light at a portion other than the openings 89A.

The shutter 88E is supported on the luminous flux-exiting side of the shielding member 89 so as to be openable and closable with respect to the opening 89A. Specifically, the shutter 88B is configured to be slightly larger than the opening 89A, and slidably supported by the shielding member 89. A surface 88F (FIGS. 8A and 8B) of the shutter 88B on the light-incident side is a reflection surface similarly to the shutter 88 of the first embodiment. The shutter 88E can move according to the expansion and contraction of the piezoelectric element 85A.

The piezoelectric element 85A is supported at one end by the circuit board 84 and at the other end by the shutter 88B so that the expansion and contraction direction of the piezoelectric element coincides with the slide direction of the shutter 88B.

In the embodiment, the position of the shutter 88B according to the expansion and contraction of the piezoelectric element 85A is set as follows.

That is, in a state where the piezoelectric element 85A contracts as shown in FIG. 7A or FIG. 8A, the shutter 88E is positioned at a first position in which the opening 89A is open without being closed by the shutter 88B and a luminous flux concentrated by the microlens 86 is allowed to pass through the opening 89A. The luminous flux passed through the opening 89A is incident on the microlens 87, collimated by the second microlens 87, and emitted to the prism 8C.

In a state where the piezoelectric element 85A expands as shown in FIG. 73 or FIG. 8B, the shutter 88B is positioned at a second position in which the opening 89A is closed by the shutter 88E and the luminous flux concentrated by the microlens 86 is blocked. The luminous flux blocked by the shutter 88B is reflected by the surface 88F and is returned to the field lens 8A side.

Gradation control is performed similarly to that of the first embodiment.

In the second embodiment, a similar advantage to that of the first embodiment can be provided.

In each of the light modulation devices 8R, 8G, and 8B in the embodiment, the light modulation section 80B having the shutter 88B and the piezoelectric element 85A is disposed in each pixel. The light modulation devices 8R, 8G, and 8B position each of the shutters 88E at the first position or the second position with each of the piezoelectric elements 85A to switch between passage and blockage of an incident luminous flux, thereby performing light modulation to form an image.

Thus, similarly to the first embodiment, longer service lives of the light modulation devices 8R, 8G, and 8B are facilitated, and light use efficiency can be improved.

The light modulation section 80B concentrates an incident luminous flux onto the opening 89A with the microlens 86, and switches between the passage and blockage of the concentrated luminous flux with the shutter 88E. Therefore, the light modulation section 80B reduces the rate of luminous flux blocked by the shielding member 89 (portion excluding the opening 89A), can improve the aperture ratio, and can further improve light use efficiency.

In the light modulation devices 8R, 8G, and 8B, the surface 88F of the shutter 88E on the light-incident side is a reflection surface that reflects an incident luminous flux. Thus, when the shutter 88E is positioned at the second position, the luminous flux blocked by the shutter 88E is reflected by the surface 88F. Therefore, the temperature rise of the shutter 88E can be reduced. Moreover, the luminous flux reflected by the surface 88F can be reused, which can further improve light use efficiency.

The invention is not limited to the embodiments. Modifications, improvements, and the like within a range where the advantage of the invention can be achieved are included in the invention.

The shape and position of the shutter (the shutters 88 and 88E), the opening (the openings 88A and 89A), and the like in each of the embodiments are not limited to those illustrated, but can be modified variously.

In each of the embodiments, the reflection surface of the surface (the surfaces 88B and 88F) of the shutter is formed by deposition. However, the shutter itself may be formed of a light reflecting member such as aluminum.

In each of the embodiments, the description has been made using, as a driver, the piezoelectric element 85A that expands and contracts in the plane direction, but this is not restrictive. As long as the position of the shutter of the embodiments can be moved, various piezoelectric elements can be used. The supporting configuration of the piezoelectric element 85A in the embodiments is not especially limited as long as the shutter can be moved. Moreover, the shutter in the embodiments is not limited to the configuration in which the shutter is directly moved by the piezoelectric element 85A.

Figure 9A:
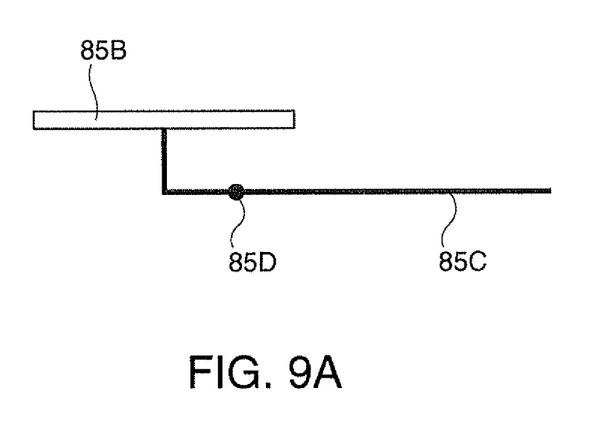
FIGS. 9A and 9B are diagrams for explaining a modified example of a driver in the embodiments.
Figure 9B:
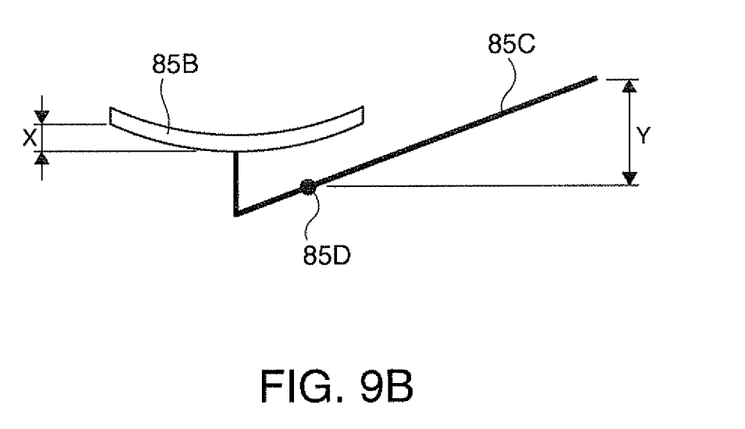

FIGS. 9A and 9B are diagrams for explaining a modified example of the driver in the embodiments.

A piezoelectric element 85B is displaced so as to bend in the thickness direction. When the expansion and contraction in the thickness direction is used to move the shutter, one end of an elongated member 85C is attached to the piezoelectric element 85B and the other end thereof is supported by the shutter as shown in FIG. 9A. By providing a fulcrum 85D at a position close to the piezoelectric element 85B of the elongated member 85C, a displacement amount Y larger than a displacement amount X of the piezoelectric element 85B can be provided as shown in FIG. 9B.

The driver is not limited to those using a piezoelectric element as long as it can move the shutter. For example, the driver may be those using magnetic force from a magnet.

Figure 10:
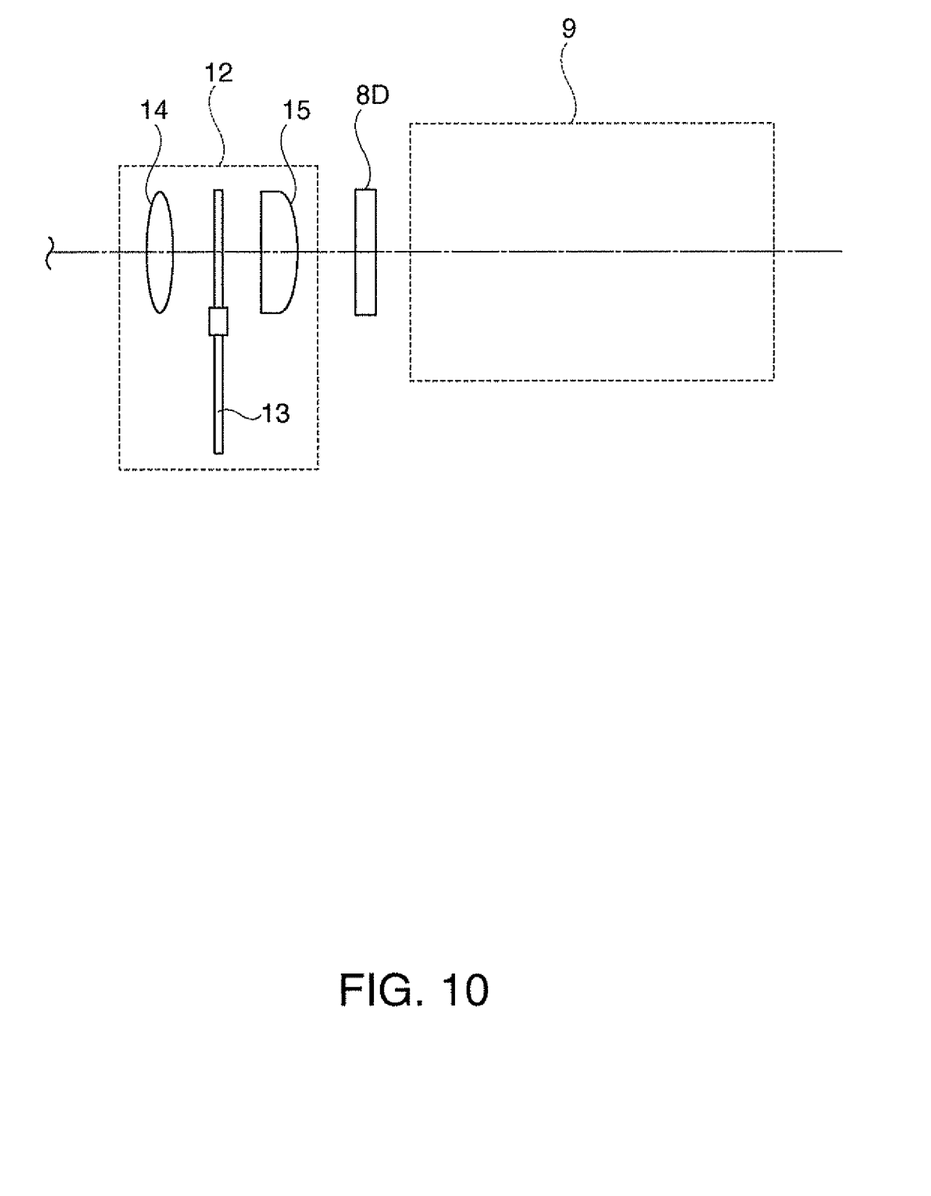
FIG. 10 is a diagram for explaining a modified example of the projector in the embodiments.

FIG. 10 is a diagram for explaining a modified example of the projector in the embodiments.

In the embodiments, the invention is applied to the projector 1 of the three-plate type in which the three light modulation devices 8R, 8G, and 8B are used for respective R, G, and B. However, this is not restrictive. The invention may be applied to a single-plate type projector shown in FIG. 10.

In the projector according to the modified example, a color-switching optical device 12 is arranged following the illumination optical device 5. The color-switching optical device 12 is configured to include a color wheel 13, a first condenser lens 14, and a second condenser lens 15. The color wheel 13 is formed in a disk shape and rotates to change a luminous flux emitted from the illumination optical device 5 to three color lights of R, G, and B. The first condenser lens 14 concentrates the luminous flux emitted from the illumination optical device 5 in the vicinity of the color wheel 13. The second condenser lens 15 substantially collimates divergent light passed through the color wheel 13.

Figure 11:
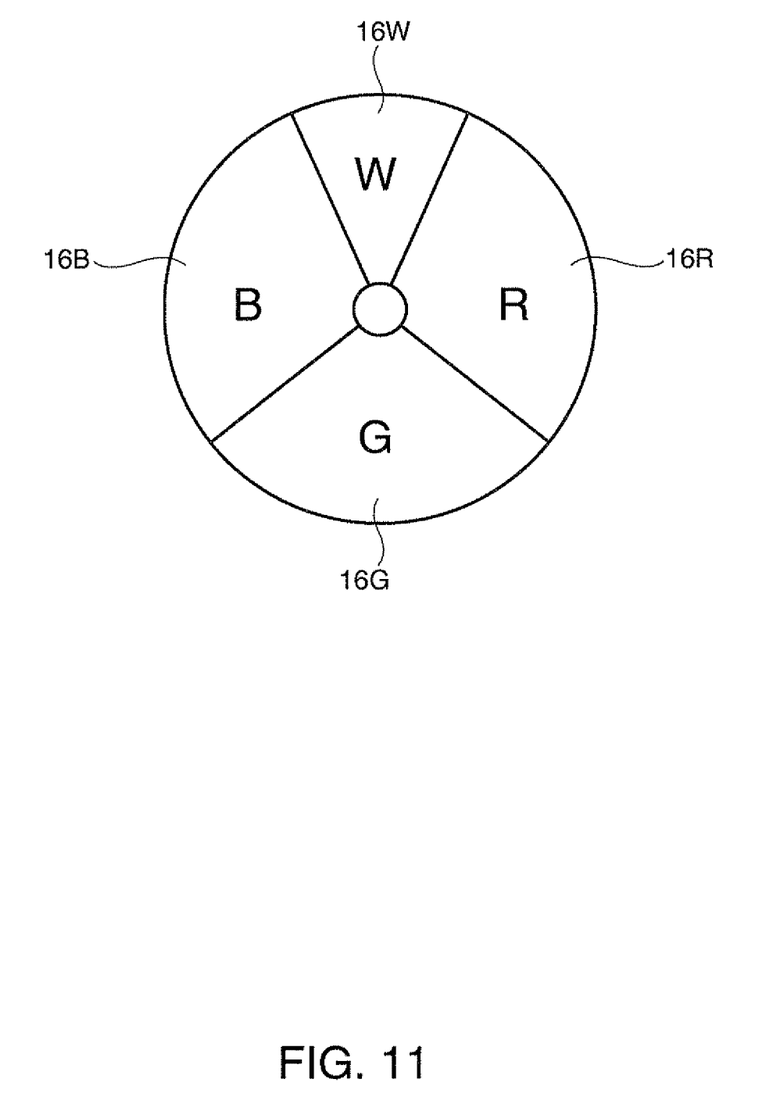
FIG. 11 is an elevation view illustrating the structure of a color wheel in a modified example.

As shown in FIG. 11 (an elevation view of the color wheel 13), the color wheel 13 includes three transmissive color filters 16R, 16G, and 16B and one light-transmissive region 16W in four fan-shaped regions sectioned along the rotational direction. The color filters 16R, 16G, and 16B respectively transmit only red, green, and blue lights. The light-transmissive region 16W allows a luminous flux emitted from the illumination optical device 5 to pass as it is.

With such a configuration, the projector can be configured with one light modulation device 8D as shown in FIG. 10.

Figure 12:
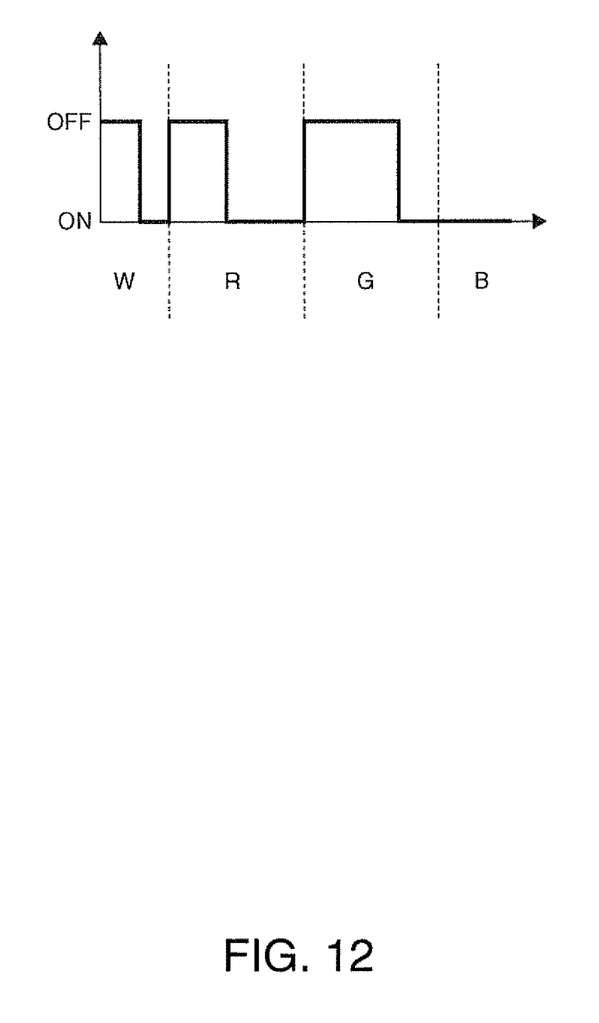
FIG. 12 is a diagram for explaining gradation control in a light modulation device of the modified example.

FIG. 12 is a diagram for explaining gradation control in the light modulation device 8D. "W" on the horizontal axis represents the time of luminous flux on an optical path in the light-transmissive region 16W, while "R", "G", and "B" respectively represent the times (unit times of the respective color lights) that the respective color filters 16R, 16G, and 16B occupy the optical path of the luminous flux. As shown in the drawing, the "ON" time and "OFF" time of the shutter 88E are time-modulated in the unit times of the respective color lights in synchronization with the rotation of the color wheel 13, whereby the gradation of an image can be controlled.

In the first embodiment, the supporting member 81 is arranged on the luminous flux-incident side between the microlenses 86 and 87, and the shutter 88 and the like are arranged on the exiting side. However, the positional relationship may be reversed.

In the first embodiment, the rotation axis 81A is used to rotate the shutter 88. However, this is not restrictive. The supporting member 81 may be provided with a recess into which the shutter 88 is fitted, and the shutter 88 may be fitted into the recess and held rotatably.

In the first embodiment, the circuit board 84 and the shutter 88 are supported on the supporting member 81. However, the configuration for supporting these members is not limited thereto. For example, it is also possible to configure the microlenses 86 and 87 with microlenses of a plate-type microlens array and use the microlens array in place of the supporting member 81.

In the second embodiment, the shielding member 89 is arranged on the luminous flux-incident side between the microlenses 86 and 87, and the shutter 88E and the like are arranged on the exiting side. However, the positional relationship may be reversed.

In the second embodiment, the microlenses 86 and 87 are used. However, this is not restrictive, and the microlenses 86 and 87 may be omitted. When the microlenses 86 and 87 are omitted, the number of members constituting the light modulation devices 8R, 8G, and 8B can be reduced, enabling a reduction in manufacturing cost.

Since the light modulation device of the invention can improve light use efficiency, it can be used for a light modulation device of display devices such as projectors.

The entire disclosure of Japanese Patent Application No: 2009-283745, filed Dec. 15, 2009 is expressly incorporated by reference herein.

What is claimed is:
1. A light modulation device that modulates an incident luminous flux according to image information to form an image, comprising:
a light modulation section that is disposed in each of pixels constituting the image, wherein
the light modulation section includes
a condensing lens that concentrates the incident luminous flux,
a shutter that is configured to be movable to a first position in which the shutter allows the luminous flux concentrated by the condensing lens to pass, or a second position in which the shutter blocks the luminous flux concentrated by the condensing lens, and
a driver that moves the shutter to the first position or the second position;
the shutter has an opening and is configured to be rotatable about a rotation axis along an opening direction of the opening, and
the driver applies force to a peripheral edge of the shutter to rotate the shutter, thereby moving the shutter to the first position in which the shutter allows the luminous flux to pass through the opening, or the second position in which the shutter blocks the luminous flux at a portion excluding the opening.

2. The light modulation device according to claim 1, further comprising a lens collimating the light which passes the shutter when the shutter moves the first position.

3. The light modulation device according to claim 2, wherein a focal point of the condensing lens coincides with a focal point of the lens.

4. The light modulation device according to claim 1, wherein
a surface of the shutter on an incident side is a reflection surface that reflects the incident luminous flux.

5. A projector comprising the light modulation device according to claim 1.

6. A light modulation device that modulates an incident luminous flux according to image information to form an image, comprising:
a light modulation section that is disposed in each of pixels constituting the image, wherein
the light modulation section includes
a shielding member that has an opening allowing the incident luminous flux to pass,
a shutter that is configured to be movable to a first position in which the shutter opens the opening, or a second position in which the shutter closes the opening,
a driver that moves the shutter to the first position or the second position;
the driver applies a force to a peripheral edge of the shutter, and
the driver comprises a piezoelectric element that expands and contracts to move the shutter.

7. The light modulation device according to claim 6, wherein
the light modulation section includes a condensing lens that concentrates the incident luminous flux onto the opening.

8. The light modulation device according to claim 6, wherein
a surface of the shutter on an incident side is a reflection surface that reflects the incident luminous flux.

9. A projector comprising the light modulation device according to claim 6.

* * * * *